(12) United States Patent
Pearson et al.

(10) Patent No.: US 8,843,970 B2
(45) Date of Patent: *Sep. 23, 2014

(54) VIDEO DISTRIBUTION SYSTEMS AND METHODS FOR MULTIPLE USERS

(75) Inventors: Larry B. Pearson, San Antonio, TX (US); J. Bradley Bridges, San Antonio, TX (US)

(73) Assignee: Chanyu Holdings, LLC, Wilmington, DE (US)

( * ) Notice: Subject to any disclaimer, the term of this patent is extended or adjusted under 35 U.S.C. 154(b) by 532 days.

This patent is subject to a terminal disclaimer.

(21) Appl. No.: 13/018,043

(22) Filed: Jan. 31, 2011

(65) Prior Publication Data

US 2011/0173656 A1 Jul. 14, 2011
US 2014/0101697 A9 Apr. 10, 2014

Related U.S. Application Data

(63) Continuation of application No. 11/932,443, filed on Oct. 31, 2007, now Pat. No. 7,908,621, which is a continuation of application No. 10/696,395, filed on Oct. 29, 2003, now Pat. No. 7,310,807.

(51) Int. Cl.
| | | |
|---|---|---|
| *H04N 7/18* | (2006.01) | |
| *H04N 21/4782* | (2011.01) | |
| *H04N 7/14* | (2006.01) | |
| *H04N 21/41* | (2011.01) | |
| *H04N 21/422* | (2011.01) | |
| *H04N 21/426* | (2011.01) | |
| *H04N 21/436* | (2011.01) | |
| *H04N 21/4363* | (2011.01) | |
| *H04N 21/438* | (2011.01) | |
| *H04N 21/442* | (2011.01) | |
| *H04N 21/45* | (2011.01) | |
| *H04N 21/475* | (2011.01) | |
| *H04N 7/16* | (2011.01) | |
| *G06F 3/00* | (2006.01) | |
| *H04N 5/50* | (2006.01) | |
| *H04N 5/44* | (2011.01) | |
| *G06F 15/16* | (2006.01) | |
| *H04N 7/10* | (2006.01) | |

(52) U.S. Cl.
CPC ........... *H04N 21/4782* (2013.01); *H04N 7/147* (2013.01); *H04N 7/106* (2013.01); *H04N 21/4122* (2013.01); *H04N 21/4126* (2013.01); *H04N 21/42204* (2013.01); *H04N 21/42692* (2013.01); *H04N 21/43615* (2013.01); *H04N 21/43637* (2013.01); *H04N 21/4383* (2013.01); *H04N 21/44222* (2013.01); *H04N 21/4532* (2013.01); *H04N 21/4751* (2013.01); *H04N 21/4753* (2013.01)
USPC ................... 725/83; 725/27; 725/30; 725/74; 725/78; 725/85; 715/752; 348/734; 348/725; 348/731; 709/206

(58) Field of Classification Search
CPC ............ H04N 7/147; H04N 21/43615; H04N 21/43637; H04N 7/106; H04N 21/4751; H04N 21/4532; H04N 5/4403; H04N 5/4401; H04N 5/50; G06Q 10/107
USPC ........ 725/78, 59, 74, 25, 38, 87, 88; 348/734; 386/262; 709/206
See application file for complete search history.

(56) References Cited

U.S. PATENT DOCUMENTS

| | | |
|---|---|---|
| 4,243,147 A | 1/1981 | Twitchell et al. |
| 4,356,509 A | 10/1982 | Skerlos et al. |

(Continued)

FOREIGN PATENT DOCUMENTS

| | | |
|---|---|---|
| WO | 99/63759 A2 | 12/1999 |
| WO | 00/28689 A2 | 5/2000 |

(Continued)

OTHER PUBLICATIONS

Kapino, S., "Accenda Universal Remote Control Targets Needs of Elderly, Visually Impaired, Physically Challenged..and the Rest of Us" Innotech Systems, Inc., Press Release, Port Jefferson, NY, Dec. 15, 2002.

(Continued)

*Primary Examiner* — Hoang-Vu A Nguyen-Ba (57) ABSTRACT

A video distribution system includes a local network interface operable to modulate video data to frequency blocks for communication via a local network. A first frequency block of the frequency blocks is associated with a first user. The video distribution system also includes a metrics engine operable to track at least one metric associated with the first user based on the video data modulated to the first frequency block.

20 Claims, 4 Drawing Sheets

(56) References Cited

U.S. PATENT DOCUMENTS

| | | |
|---|---|---|
| 4,768,926 A | 9/1988 | Gilbert, Jr. |
| 4,907,079 A | 3/1990 | Turner et al. |
| 5,126,731 A | 6/1992 | Cromer, Jr. et al. |
| 5,163,340 A | 11/1992 | Bender |
| 5,475,835 A | 12/1995 | Hickey |
| 5,532,748 A | 7/1996 | Naimpally |
| 5,541,917 A | 7/1996 | Farris |
| 5,574,964 A | 11/1996 | Hamlin |
| 5,589,892 A | 12/1996 | Knee et al. |
| 5,592,477 A | 1/1997 | Farris et al. |
| 5,610,916 A | 3/1997 | Kostreski et al. |
| 5,613,012 A | 3/1997 | Hoffman et al. |
| 5,650,831 A | 7/1997 | Farwell |
| 5,651,332 A | 7/1997 | Moore et al. |
| 5,656,898 A | 8/1997 | Kalina |
| 5,675,390 A | 10/1997 | Schindler et al. |
| 5,708,961 A | 1/1998 | Hylton et al. |
| 5,722,041 A | 2/1998 | Freadman |
| 5,724,106 A | 3/1998 | Autry et al. |
| 5,729,825 A | 3/1998 | Kostreski et al. |
| 5,734,853 A | 3/1998 | Hendricks et al. |
| 5,774,357 A | 6/1998 | Hoffberg et al. |
| 5,793,438 A | 8/1998 | Bedard |
| 5,805,719 A | 9/1998 | Pare, Jr. et al. |
| 5,818,438 A | 10/1998 | Howe et al. |
| 5,828,403 A | 10/1998 | DeRodeff et al. |
| 5,838,384 A | 11/1998 | Schindler et al. |
| 5,838,812 A | 11/1998 | Pare, Jr. et al. |
| 5,864,757 A | 1/1999 | Parker |
| 5,867,223 A | 2/1999 | Schindler et al. |
| 5,892,508 A | 4/1999 | Howe et al. |
| 5,900,867 A | 5/1999 | Schindler et al. |
| 5,910,970 A | 6/1999 | Lu |
| 5,933,498 A | 8/1999 | Schneck et al. |
| 5,953,318 A | 9/1999 | Nattkemper et al. |
| 5,956,024 A | 9/1999 | Strickland et al. |
| 5,956,716 A | 9/1999 | Kenner et al. |
| 5,970,088 A | 10/1999 | Chen |
| 5,987,061 A | 11/1999 | Chen |
| 5,990,927 A | 11/1999 | Hendricks et al. |
| 5,995,155 A | 11/1999 | Schindler et al. |
| 5,999,518 A | 12/1999 | Nattkemper et al. |
| 5,999,563 A | 12/1999 | Polley et al. |
| 6,002,722 A | 12/1999 | Wu |
| 6,014,184 A | 1/2000 | Knee et al. |
| 6,021,158 A | 2/2000 | Schurr et al. |
| 6,021,167 A | 2/2000 | Wu |
| 6,028,600 A | 2/2000 | Rosin et al. |
| 6,029,045 A | 2/2000 | Picco et al. |
| 6,038,251 A | 3/2000 | Chen |
| 6,044,107 A | 3/2000 | Gatherer et al. |
| 6,052,120 A | 4/2000 | Nahi et al. |
| 6,055,268 A | 4/2000 | Timm et al. |
| 6,072,483 A | 6/2000 | Rosin et al. |
| 6,084,584 A | 7/2000 | Nahi et al. |
| 6,111,582 A | 8/2000 | Jenkins |
| 6,118,498 A | 9/2000 | Reitmeier |
| 6,122,660 A | 9/2000 | Baransky et al. |
| 6,124,799 A | 9/2000 | Parker |
| 6,137,839 A | 10/2000 | Mannering et al. |
| 6,166,734 A | 12/2000 | Nahi et al. |
| 6,181,335 B1 | 1/2001 | Hendricks et al. |
| 6,192,282 B1 | 2/2001 | Smith et al. |
| 6,195,692 B1 | 2/2001 | Hsu |
| 6,202,211 B1 | 3/2001 | Williams |
| 6,215,483 B1 | 4/2001 | Zigmond |
| 6,237,022 B1 | 5/2001 | Bruck et al. |
| 6,243,366 B1 | 6/2001 | Bradley et al. |
| 6,252,588 B1 | 6/2001 | Dawson |
| 6,252,989 B1 | 6/2001 | Geisler et al. |
| 6,260,192 B1 | 7/2001 | Rosin et al. |
| 6,269,394 B1 | 7/2001 | Kenner et al. |
| 6,275,268 B1 | 8/2001 | Ellis et al. |
| 6,275,989 B1 | 8/2001 | Broadwin et al. |
| 6,281,813 B1 | 8/2001 | Vierthaler et al. |
| 6,286,142 B1 | 9/2001 | Ehreth |
| 6,295,057 B1 | 9/2001 | Rosin et al. |
| 6,311,214 B1 | 10/2001 | Rhoads |
| 6,314,409 B2 | 11/2001 | Schneck et al. |
| 6,317,884 B1 | 11/2001 | Eames et al. |
| 6,344,882 B1 | 2/2002 | Shim et al. |
| 6,357,043 B1 | 3/2002 | Ellis et al. |
| 6,359,636 B1 | 3/2002 | Schindler et al. |
| 6,359,661 B1 | 3/2002 | Nickum |
| 6,363,149 B1 | 3/2002 | Candelore |
| 6,385,693 B1 | 5/2002 | Gerszberg et al. |
| 6,396,480 B1 | 5/2002 | Schindler et al. |
| 6,396,531 B1 | 5/2002 | Gerszberg et al. |
| 6,396,544 B1 | 5/2002 | Schindler et al. |
| 6,397,387 B1 | 5/2002 | Rosin et al. |
| 6,400,407 B1 | 6/2002 | Zigmond et al. |
| 6,411,307 B1 | 6/2002 | Rosin et al. |
| 6,418,149 B1 | 7/2002 | Swisher et al. |
| 6,430,233 B1 | 8/2002 | Dillon et al. |
| 6,442,285 B2 | 8/2002 | Rhoads et al. |
| 6,442,549 B1 | 8/2002 | Schneider |
| 6,449,601 B1 | 9/2002 | Friedland et al. |
| 6,450,407 B1 | 9/2002 | Freeman et al. |
| 6,460,075 B2 | 10/2002 | Krueger et al. |
| 6,463,585 B1 | 10/2002 | Hendricks et al. |
| 6,481,011 B1 | 11/2002 | Lemmons |
| 6,486,892 B1 | 11/2002 | Stern |
| 6,492,913 B2 | 12/2002 | Vierthaler et al. |
| 6,493,875 B1 | 12/2002 | Eames et al. |
| 6,496,983 B1 | 12/2002 | Schindler et al. |
| 6,502,242 B1 | 12/2002 | Howe et al. |
| 6,505,348 B1 | 1/2003 | Knowles et al. |
| 6,510,519 B2 | 1/2003 | Wasilewski et al. |
| 6,515,680 B1 | 2/2003 | Hendricks et al. |
| 6,516,467 B1 | 2/2003 | Schindler et al. |
| 6,519,011 B1 | 2/2003 | Shendar |
| 6,522,769 B1 | 2/2003 | Rhoads et al. |
| 6,526,577 B1 | 2/2003 | Knudson et al. |
| 6,529,949 B1 | 3/2003 | Getsin et al. |
| 6,535,590 B2 | 3/2003 | Tidwell et al. |
| 6,538,704 B1 | 3/2003 | Grabb et al. |
| 6,542,740 B1 | 4/2003 | Olgaard et al. |
| 6,557,030 B1 | 4/2003 | Hoang |
| 6,567,982 B1 | 5/2003 | Howe et al. |
| 6,587,873 B1 | 7/2003 | Nobakht et al. |
| 6,598,231 B1 | 7/2003 | Basawapatna et al. |
| 6,599,199 B1 | 7/2003 | Hapshie |
| 6,607,136 B1 | 8/2003 | Atsmon et al. |
| 6,609,253 B1 | 8/2003 | Swix et al. |
| 6,611,537 B1 | 8/2003 | Edens et al. |
| 6,614,987 B1 | 9/2003 | Ismail et al. |
| 6,622,148 B1 | 9/2003 | Noble et al. |
| 6,622,307 B1 | 9/2003 | Ho |
| 6,631,523 B1 | 10/2003 | Matthews, III et al. |
| 6,640,239 B1 | 10/2003 | Gidwani |
| 6,643,495 B1 | 11/2003 | Gallery et al. |
| 6,643,684 B1 | 11/2003 | Malkin et al. |
| 6,650,761 B1 | 11/2003 | Rodriguez et al. |
| 6,658,568 B1 | 12/2003 | Ginter et al. |
| 6,678,215 B1 | 1/2004 | Treyz et al. |
| 6,678,733 B1 | 1/2004 | Brown et al. |
| 6,690,392 B1 | 2/2004 | Wugoski |
| 6,693,236 B1 | 2/2004 | Gould et al. |
| 6,701,523 B1 | 3/2004 | Hancock et al. |
| 6,704,931 B1 | 3/2004 | Schaffer et al. |
| 6,714,264 B1 | 3/2004 | Kempisty |
| 6,725,281 B1 | 4/2004 | Zintel et al. |
| 6,731,393 B1 | 5/2004 | Currans et al. |
| 6,732,179 B1 | 5/2004 | Brown et al. |
| 6,745,223 B1 | 6/2004 | Nobakht et al. |
| 6,745,392 B1 | 6/2004 | Basawapatna et al. |
| 6,754,206 B1 | 6/2004 | Nattkemper et al. |
| 6,754,904 B1 | 6/2004 | Cooper et al. |
| 6,756,997 B1 | 6/2004 | Ward, III et al. |
| 6,760,918 B2 | 7/2004 | Rodriguez et al. |
| 6,762,773 B2 | 7/2004 | Kolde et al. |
| 6,763,226 B1 | 7/2004 | McZeal, Jr. |
| 6,765,557 B1 | 7/2004 | Segal et al. |
| 6,766,305 B1 | 7/2004 | Fucarile et al. |

(56) References Cited

U.S. PATENT DOCUMENTS

| | | |
|---|---|---|
| 6,769,128 B1 | 7/2004 | Knee et al. |
| 6,771,317 B2 | 8/2004 | Ellis et al. |
| 6,773,344 B1 | 8/2004 | Gabai et al. |
| 6,778,559 B2 | 8/2004 | Hyakutake |
| 6,779,004 B1 | 8/2004 | Zintel |
| 6,781,518 B1 | 8/2004 | Hayes et al. |
| 6,784,804 B1 | 8/2004 | Hayes et al. |
| 6,785,716 B1 | 8/2004 | Nobakht et al. |
| 6,785,901 B1 | 8/2004 | Horiwitz et al. |
| 6,788,709 B1 | 9/2004 | Hyakutake |
| 6,804,824 B1 | 10/2004 | Potrebic et al. |
| 6,826,775 B1 | 11/2004 | Howe et al. |
| 6,828,993 B1 | 12/2004 | Hendricks et al. |
| 6,909,874 B2 | 6/2005 | Holtz et al. |
| 6,938,021 B2 | 8/2005 | Shear et al. |
| 6,975,364 B2 * | 12/2005 | Lin ............................ 348/552 |
| 6,978,474 B1 | 12/2005 | Sheppard et al. |
| 7,235,513 B2 | 6/2007 | Isaac |
| 7,260,825 B2 | 8/2007 | Ansari et al. |
| 7,307,574 B2 | 12/2007 | Kortum |
| 7,310,807 B2 | 12/2007 | Pearson |
| 7,436,346 B2 | 10/2008 | Walter |
| 7,474,359 B2 | 1/2009 | Sullivan |
| 2001/0011261 A1 | 8/2001 | Mullen-Schultz |
| 2001/0016945 A1 | 8/2001 | Inoue |
| 2001/0016946 A1 | 8/2001 | Inoue |
| 2001/0016949 A1 * | 8/2001 | Lee ............................ 725/111 |
| 2001/0034664 A1 | 10/2001 | Brunson |
| 2001/0044794 A1 | 11/2001 | Nasr et al. |
| 2001/0048677 A1 | 12/2001 | Boys |
| 2001/0049826 A1 | 12/2001 | Wilf |
| 2001/0054008 A1 | 12/2001 | Miller et al. |
| 2001/0054009 A1 | 12/2001 | Miller et al. |
| 2001/0054067 A1 | 12/2001 | Miller et al. |
| 2001/0056350 A1 | 12/2001 | Calderone et al. |
| 2002/0001303 A1 | 1/2002 | Boys |
| 2002/0001310 A1 | 1/2002 | Mai et al. |
| 2002/0002496 A1 | 1/2002 | Miller et al. |
| 2002/0003166 A1 | 1/2002 | Miller et al. |
| 2002/0007307 A1 | 1/2002 | Miller et al. |
| 2002/0007313 A1 | 1/2002 | Mai et al. |
| 2002/0007485 A1 | 1/2002 | Rodriguez et al. |
| 2002/0010639 A1 | 1/2002 | Howey et al. |
| 2002/0010745 A1 | 1/2002 | Schneider |
| 2002/0010935 A1 | 1/2002 | Sitnik |
| 2002/0016736 A1 | 2/2002 | Cannon et al. |
| 2002/0022963 A1 | 2/2002 | Miller et al. |
| 2002/0022970 A1 | 2/2002 | Noll et al. |
| 2002/0022992 A1 | 2/2002 | Miller et al. |
| 2002/0022993 A1 | 2/2002 | Miller et al. |
| 2002/0022994 A1 | 2/2002 | Miller et al. |
| 2002/0022995 A1 | 2/2002 | Miller et al. |
| 2002/0023959 A1 | 2/2002 | Miller et al. |
| 2002/0026357 A1 | 2/2002 | Miller et al. |
| 2002/0026358 A1 | 2/2002 | Miller et al. |
| 2002/0026369 A1 | 2/2002 | Miller et al. |
| 2002/0026475 A1 | 2/2002 | Marmor |
| 2002/0029181 A1 | 3/2002 | Miller et al. |
| 2002/0030105 A1 | 3/2002 | Miller et al. |
| 2002/0032603 A1 | 3/2002 | Yeiser |
| 2002/0035404 A1 | 3/2002 | Ficco et al. |
| 2002/0040475 A1 | 4/2002 | Yap et al. |
| 2002/0042915 A1 | 4/2002 | Kubischta et al. |
| 2002/0046093 A1 | 4/2002 | Miller et al. |
| 2002/0049635 A1 | 4/2002 | Mai et al. |
| 2002/0054087 A1 | 5/2002 | Noll et al. |
| 2002/0054750 A1 | 5/2002 | Ficco et al. |
| 2002/0059163 A1 | 5/2002 | Smith |
| 2002/0059425 A1 | 5/2002 | Belfiore et al. |
| 2002/0059599 A1 | 5/2002 | Schein et al. |
| 2002/0065717 A1 | 5/2002 | Miller et al. |
| 2002/0067438 A1 | 6/2002 | Baldock |
| 2002/0069220 A1 | 6/2002 | Tran |
| 2002/0069282 A1 | 6/2002 | Reisman |
| 2002/0069294 A1 | 6/2002 | Herkersdorf et al. |
| 2002/0072970 A1 | 6/2002 | Miller et al. |
| 2002/0078442 A1 | 6/2002 | Reyes et al. |
| 2002/0097261 A1 | 7/2002 | Gottfurcht et al. |
| 2002/0106119 A1 | 8/2002 | Foran et al. |
| 2002/0112239 A1 | 8/2002 | Goldman |
| 2002/0116392 A1 | 8/2002 | McGrath et al. |
| 2002/0124055 A1 | 9/2002 | Reisman |
| 2002/0128061 A1 | 9/2002 | Blanco |
| 2002/0129094 A1 | 9/2002 | Reisman |
| 2002/0133402 A1 | 9/2002 | Faber et al. |
| 2002/0138840 A1 | 9/2002 | Schein et al. |
| 2002/0152264 A1 | 10/2002 | Yamasaki |
| 2002/0169611 A1 | 11/2002 | Guerra et al. |
| 2002/0170063 A1 | 11/2002 | Ansari et al. |
| 2002/0173344 A1 | 11/2002 | Cupps et al. |
| 2002/0188955 A1 | 12/2002 | Thompson et al. |
| 2002/0193997 A1 | 12/2002 | Fitzpatrick et al. |
| 2002/0194601 A1 | 12/2002 | Perkes et al. |
| 2002/0198874 A1 | 12/2002 | Nasr et al. |
| 2003/0005445 A1 | 1/2003 | Schein et al. |
| 2003/0009771 A1 | 1/2003 | Chang |
| 2003/0012365 A1 | 1/2003 | Goodman |
| 2003/0014750 A1 | 1/2003 | Kamen |
| 2003/0018975 A1 | 1/2003 | Stone |
| 2003/0023435 A1 | 1/2003 | Josephson |
| 2003/0023440 A1 | 1/2003 | Chu |
| 2003/0028872 A1 | 2/2003 | Milovanovic et al. |
| 2003/0028890 A1 | 2/2003 | Swart et al. |
| 2003/0033416 A1 | 2/2003 | Schwartz |
| 2003/0043915 A1 | 3/2003 | Costa et al. |
| 2003/0046091 A1 | 3/2003 | Arneson et al. |
| 2003/0046689 A1 | 3/2003 | Gaos |
| 2003/0056223 A1 | 3/2003 | Costa et al. |
| 2003/0058277 A1 | 3/2003 | Bowman-Amuah |
| 2003/0061611 A1 | 3/2003 | Pendakur |
| 2003/0071792 A1 | 4/2003 | Safadi |
| 2003/0093793 A1 | 5/2003 | Gutta |
| 2003/0100340 A1 | 5/2003 | Cupps et al. |
| 2003/0110161 A1 | 6/2003 | Schneider |
| 2003/0110503 A1 | 6/2003 | Perkes |
| 2003/0126136 A1 | 7/2003 | Omoigui |
| 2003/0135771 A1 | 7/2003 | Cupps et al. |
| 2003/0140343 A1 | 7/2003 | Falvo et al. |
| 2003/0141987 A1 | 7/2003 | Hayes |
| 2003/0145321 A1 | 7/2003 | Bates et al. |
| 2003/0149989 A1 | 8/2003 | Hunter et al. |
| 2003/0153353 A1 | 8/2003 | Cupps et al. |
| 2003/0153354 A1 | 8/2003 | Cupps et al. |
| 2003/0159026 A1 | 8/2003 | Cupps et al. |
| 2003/0160830 A1 | 8/2003 | DeGross |
| 2003/0163601 A1 | 8/2003 | Cupps et al. |
| 2003/0163666 A1 | 8/2003 | Cupps et al. |
| 2003/0172380 A1 | 9/2003 | Kikinis |
| 2003/0182237 A1 | 9/2003 | Costa et al. |
| 2003/0182420 A1 | 9/2003 | Jones et al. |
| 2003/0185232 A1 | 10/2003 | Moore et al. |
| 2003/0187641 A1 | 10/2003 | Moore et al. |
| 2003/0187646 A1 | 10/2003 | Smyers et al. |
| 2003/0187800 A1 | 10/2003 | Moore et al. |
| 2003/0189509 A1 | 10/2003 | Hayes et al. |
| 2003/0189589 A1 | 10/2003 | LeBlanc et al. |
| 2003/0194141 A1 | 10/2003 | Kortum et al. |
| 2003/0194142 A1 | 10/2003 | Kortum et al. |
| 2003/0208396 A1 | 11/2003 | Miller et al. |
| 2003/0208758 A1 | 11/2003 | Schein et al. |
| 2003/0226044 A1 | 12/2003 | Cupps et al. |
| 2003/0226145 A1 | 12/2003 | Marsh |
| 2003/0229900 A1 | 12/2003 | Reisman |
| 2003/0231258 A1 * | 12/2003 | Lin ............................ 348/552 |
| 2004/0003041 A1 | 1/2004 | Moore et al. |
| 2004/0003403 A1 | 1/2004 | Marsh |
| 2004/0006769 A1 | 1/2004 | Ansari et al. |
| 2004/0006772 A1 | 1/2004 | Ansari et al. |
| 2004/0010602 A1 | 1/2004 | Van Vleck et al. |
| 2004/0015997 A1 | 1/2004 | Ansari et al. |
| 2004/0030750 A1 | 2/2004 | Moore et al. |
| 2004/0031058 A1 | 2/2004 | Reisman |
| 2004/0031856 A1 | 2/2004 | Atsmon et al. |
| 2004/0034877 A1 | 2/2004 | Nogues |

(56) References Cited

U.S. PATENT DOCUMENTS

| | | |
|---|---|---|
| 2004/0049728 A1 | 3/2004 | Langford |
| 2004/0064351 A1 | 4/2004 | Mikurak |
| 2004/0068740 A1 | 4/2004 | Fukuda et al. |
| 2004/0068753 A1 | 4/2004 | Robertson et al. |
| 2004/0070491 A1 | 4/2004 | Huang et al. |
| 2004/0073918 A1 | 4/2004 | Ferman et al. |
| 2004/0098571 A1 | 5/2004 | Falcon |
| 2004/0107125 A1 | 6/2004 | Guheen et al. |
| 2004/0107439 A1 | 6/2004 | Hassell et al. |
| 2004/0111745 A1 | 6/2004 | Schein et al. |
| 2004/0111756 A1 | 6/2004 | Stuckman et al. |
| 2004/0117813 A1 | 6/2004 | Karaoguz et al. |
| 2004/0117824 A1 | 6/2004 | Karaoguz et al. |
| 2004/0128342 A1 | 7/2004 | Maes et al. |
| 2004/0139173 A1 | 7/2004 | Karaoguz et al. |
| 2004/0143600 A1 | 7/2004 | Musgrove et al. |
| 2004/0143652 A1 | 7/2004 | Grannan et al. |
| 2004/0148408 A1 | 7/2004 | Nadarajah |
| 2004/0150676 A1 | 8/2004 | Gottfurcht et al. |
| 2004/0183839 A1 | 9/2004 | Gottfurcht et al. |
| 2004/0194136 A1 | 9/2004 | Finseth et al. |
| 2004/0198386 A1 | 10/2004 | Dupray |
| 2004/0201600 A1 | 10/2004 | Kakivaya et al. |
| 2004/0210633 A1 | 10/2004 | Brown et al. |
| 2004/0210935 A1 | 10/2004 | Schein et al. |
| 2004/0213271 A1 | 10/2004 | Lovy et al. |
| 2004/0221302 A1 | 11/2004 | Ansari et al. |
| 2004/0223485 A1 | 11/2004 | Arellano et al. |
| 2004/0226035 A1 | 11/2004 | Hauser, Jr. |
| 2004/0226045 A1 | 11/2004 | Nadarajah |
| 2004/0239624 A1 | 12/2004 | Ramian |
| 2004/0252119 A1 | 12/2004 | Hunleth et al. |
| 2004/0252120 A1 | 12/2004 | Hunleth et al. |
| 2004/0252769 A1 | 12/2004 | Costa et al. |
| 2004/0252770 A1 | 12/2004 | Costa et al. |
| 2004/0260407 A1 | 12/2004 | Wimsatt |
| 2004/0261116 A1 | 12/2004 | McKeown et al. |
| 2004/0267729 A1 | 12/2004 | Swaminathan et al. |
| 2004/0268393 A1 | 12/2004 | Hunleth et al. |
| 2005/0015805 A1 | 1/2005 | Iwamura |
| 2005/0027851 A1 | 2/2005 | McKeown et al. |
| 2005/0038814 A1 | 2/2005 | Iyengar et al. |
| 2005/0044280 A1 | 2/2005 | Reisman |
| 2005/0097612 A1 | 5/2005 | Pearson et al. |
| 2005/0132295 A1 | 6/2005 | Noll et al. |
| 2005/0149988 A1 | 7/2005 | Grannan |
| 2005/0195961 A1 | 9/2005 | Pasquale et al. |
| 2005/0251827 A1 | 11/2005 | Ellis et al. |
| 2006/0026663 A1 | 2/2006 | Kortum |
| 2006/0037043 A1 | 2/2006 | Kortum |
| 2006/0037083 A1 | 2/2006 | Kortum |
| 2006/0048178 A1 | 3/2006 | Kortum |
| 2006/0077921 A1 | 4/2006 | Radpour |
| 2006/0114360 A1 | 6/2006 | Kortum |
| 2006/0117374 A1 | 6/2006 | Kortum |
| 2006/0156372 A1 | 7/2006 | Cansler Jr. |
| 2006/0161953 A1 | 7/2006 | Walter |
| 2006/0168610 A1 | 7/2006 | Williams |
| 2006/0174279 A1 | 8/2006 | Sullivan |
| 2006/0174309 A1 | 8/2006 | Pearson |
| 2006/0179466 A1 | 8/2006 | Pearson |
| 2006/0179468 A1 | 8/2006 | Pearson |
| 2006/0184991 A1 | 8/2006 | Schlamp |
| 2006/0184992 A1 | 8/2006 | Kortum |
| 2006/0190402 A1 | 8/2006 | Patron |
| 2006/0218590 A1 | 9/2006 | White |
| 2006/0230421 A1 | 10/2006 | Pierce |
| 2006/0236343 A1 | 10/2006 | Chang |
| 2006/0268917 A1 | 11/2006 | Nadarajah |
| 2006/0282785 A1 | 12/2006 | McCarthy |
| 2006/0290814 A1 | 12/2006 | Walter |
| 2006/0294559 A1 | 12/2006 | Ansari |
| 2006/0294561 A1 | 12/2006 | Grannan |
| 2006/0294568 A1 | 12/2006 | Walter |
| 2007/0011133 A1 | 1/2007 | Chang |
| 2007/0011250 A1 | 1/2007 | Kortum |
| 2007/0021211 A1 | 1/2007 | Walter |
| 2007/0025449 A1 | 2/2007 | Van Vleck |

FOREIGN PATENT DOCUMENTS

| | | |
|---|---|---|
| WO | 01/60066 A1 | 8/2001 |
| WO | 02/17627 A2 | 2/2002 |
| WO | 02/058382 A1 | 7/2002 |
| WO | 03/003710 A2 | 1/2003 |
| WO | 03/025726 A1 | 3/2003 |
| WO | 2004018060 A2 | 3/2004 |
| WO | 2004032514 A1 | 4/2004 |
| WO | 2004/062279 A1 | 7/2004 |
| WO | 2005/045554 A2 | 5/2005 |

OTHER PUBLICATIONS

International Search Report and Written Opinion of the International Searching Authority for International Application No. PCT/US04/33726, Mailed on Apr. 6TH, 2005.

\* cited by examiner

VIDEO DISTRIBUTION SYSTEMS AND METHODS FOR MULTIPLE USERS

CROSS-REFERENCE TO RELATED APPLICATIONS

The present application is a continuation of and claims priority from U.S. patent application Ser. No. 11/932,443 (issued as U.S. Pat. No. 7,908,621), filed Oct. 31, 2007, entitled "SYSTEM AND APPARATUS FOR LOCAL VIDEO DISTRIBUTION," which is a continuation of and claims priority from U.S. patent application Ser. No. 10/696,395 (issued as U.S. Pat. No. 7,310,807), filed Oct. 29, 2003, entitled "SYSTEM AND METHOD FOR LOCAL VIDEO DISTRIBUTION," each of which is incorporated by reference herein in its entirety.

FIELD OF THE DISCLOSURE

The present disclosure relates generally to video content communication, and more specifically to a system and method for local video distribution.

BACKGROUND

Video distribution services like cable television services and direct broadcast satellite (DBS) television services send a signal representing several different channels to the premises of their customers. In many cases, this incoming signal is digital and represents literally hundreds of different channels. With so many channels, a consumer may need to employ a device to "tune in" a given channel. This may be especially true when some of the channels represent so-called premium channels.

The "tuning-in" process typically involves parsing the incoming signal to identify the portions that represent the desired channel and then decoding those portions. Devices that perform the parsing and decoding processes may include, among others, a personal computer executing some video application or a set-top box (STB). Conventionally, an STB or other tuning device is necessary for television viewers or customers who wish to use an analog television set to receive digital broadcasts.

In many cases, a video distribution service provider will make an STB and a remote control for that STB available to the customer. The typical STB will actually rest on top of the television it supports. If a customer wants to receive the video distribution service in more than one room of the house or on more than one television, the customer will likely need to purchase or secure additional STBs. As the number of televisions to be used increases, the cost associated with receiving the service may become too high. The amount of space taken up by multiple STBs may become too large, and the number of additional remote controls within the home may become too confusing.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION

As mentioned above, FIG. 1 presents a block diagram of a video distribution system 10 that incorporates teachings of the present disclosure. As depicted, system 10 includes an integrated tuning device 12, which may be an STB, a personal computer executing a video application, or some other electronic device capable of performing STB-like functions. As depicted, device 12 includes a network interface adapter 14 providing at least a portion of a communication path interconnecting device 12 to a wide area communication network, which may include a cable network, a direct broadcast satellite (DBS) system, a telecommunication network, and/or some other network capable of communicating information to device 12.

Figure 1:
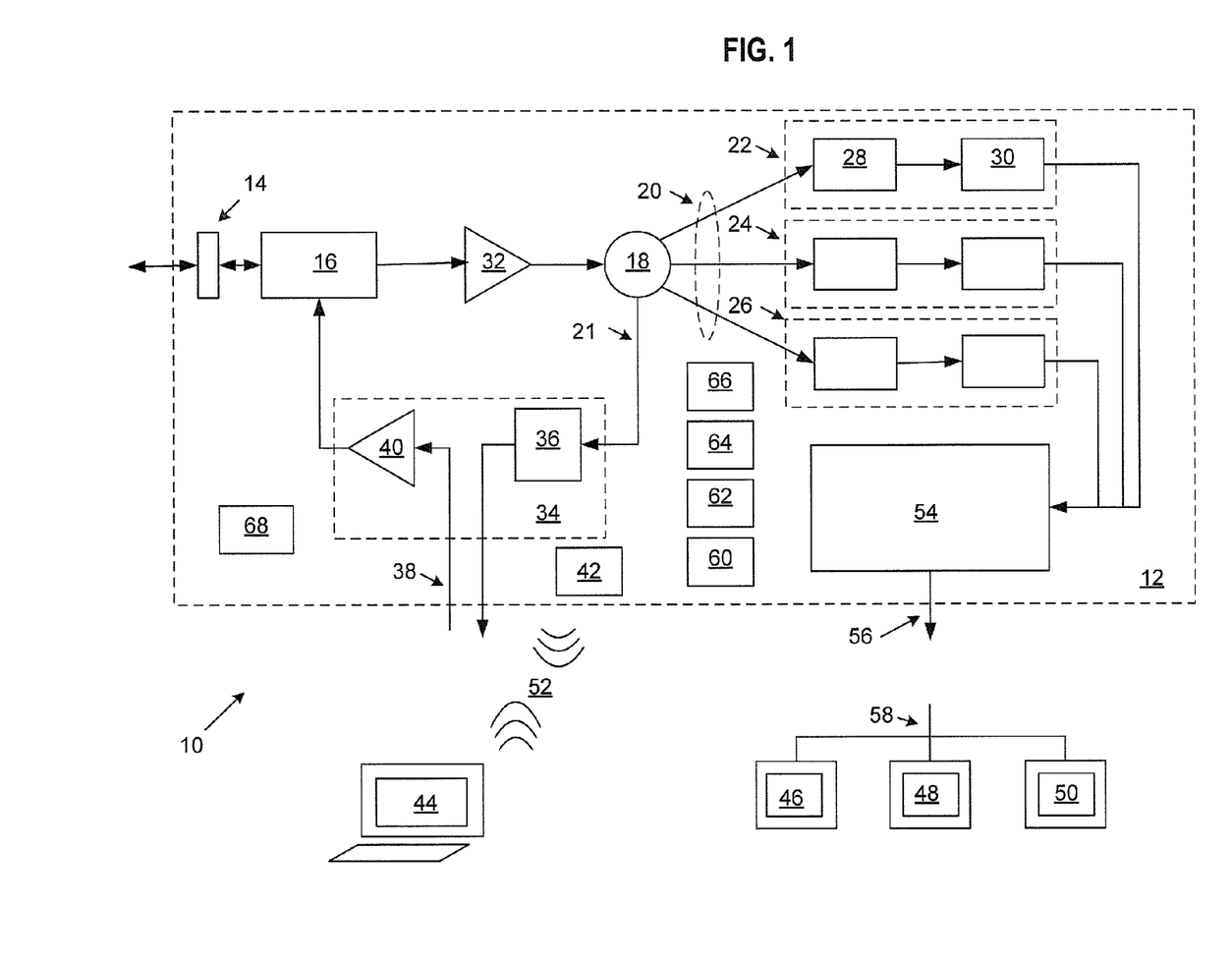
FIG. 1 presents a block diagram of a video distribution system that incorporates teachings of the present disclosure.

In operation, adapter 14 may receive a multiplexed signal representing several different video information streams. For example, a cable service provider may send a signal to each customer that represents hundreds of broadcast video channels and several more broadcast audio channels. Satellite television providers, like DBS providers, may provide even more channels. Many of the distributed video channels may be "premium" channels, and a service provider may charge additional monies for viewing a program on one of these premium channels.

In some embodiments of device 12, adapter 14 may perform front-end subsystem functions like signal reception, demodulation, error correction, signal encoding, and/or other signal manipulations. Many of these subsystem functions may be provider specific. For example, a signal coming from a cable head end may require front end processing that is substantially different than the processing performed on a DBS signal.

Adapter 14 may output a processed signal to diplexer 16. As depicted, device 12 may be capable of performing several high-end functions. For example, in addition to performing some STB-like functions, device 12 may also effectively function as a multimedia desktop computer that runs a variety of advanced services such as videoconferencing, home networking, Internet Protocol telephony, Video on Demand (VoD), high-speed Internet Television, personal video recording, and/or others. Diplexer 16 may facilitate some of these services by distinguish between upstream and downstream communication flow. In some embodiments, upstream traffic may be carried in a defined frequency range that is different than the defined frequency range of downstream traffic. As such, diplexer 16 may be able to separate upstream from downstream traffic by reference to the frequency of the signals.

Diplexer 16 may output a downstream multiplexed signal to a splitter 18, which may be passive in operation. In some embodiments, splitter 18 may passively split a signal into intermediate signals, which may be identical or nearly identical to each other. As shown, splitter 18 may create three split streams 20 and one downstream data stream 21. Split streams 20 may feed three separate output modules 22, 24, and 26. As shown, an output module, like module 22, may include a decoder 28 and a modulator 30. Because splitting a signal may degrade the noise figure (NF) of a system, a low noise, high linearity amplifier 32 may be added to device 12 upstream of splitter 18. In some embodiments, amplifier 32 may be low noise and high linearity so as not to compromise what is downstream in the signal chain.

As shown, splitter 18 may also pass a data stream 21 to a modem 34, which may be integral to or separate from device 12. Modem 34 may be a cable modem supporting a DOCSIS standard, a dial-up modem, a wireless modem, a satellite modem, and/or an xDSL modem. In some embodiments, a tuner 36 may alter stream 21 and output a signal in a form or modulation schema acceptable to modem 34. On the upstream side, an outgoing signal 38 may pass through amplifier 40 and into diplexer 16 for delivery to a broader network, like the Public Internet.

In some embodiments, module 22 and/or components of module 22 may be remote controllable. In practice, a remote control device may communicate a request signal to decoder 28 requesting decoder 28 to find and decode a specific video information stream included in the multiplexed signal. The remote control device may communicate the request via a radio frequency (RF) signal, an infrared signal, and/or via some other mechanism. In an embodiment using RF signaling, the remote control may communicate with decoder 28 via wireless local area network (WLAN) module 42.

In some embodiments, module 42 may operate as a WLAN hub and may support communication via a 900 MHz communication signal similar to those employed by cordless telephones, an 802.11(x) communication protocol, a Bluetooth communication protocol, or some other WLAN communication technique. When operating as a WLAN hub, module 42 may effectively allow device 12 to act as a wireless home networking hub. As such, other electronic devices in the home, like computer 44 and televisions 46, 48, and 50 may be able to enjoy Internet access via device 12 and wireless link 52.

Device 12 may also include a combiner 54, which may output a composite signal 56 for communication via a premise network 58. Composite signal 56 may include various video information streams modulated onto selected radio frequency (RF) bands. For example, output from module 22 may be modulated on a carrier frequency having an assigned frequency range of approximately 60 to 66 MHz. Output from module 24 may be modulated on a carrier frequency having an assigned frequency range of approximately 66 to 72 MHz, and output from module 26 may be modulated on a carrier frequency having an assigned frequency range of approximately 76 to 82 MHz. The assigned frequency ranges may correspond to the 6 MHz slices of the Very High Frequency (VHF) spectrum and the Ultra-High Frequency (UHF) spectrum assigned by the Federal Communications Commission (FCC) to television channels.

The FCC established television channels 2 to 6 using 6 MHz blocks of VHF frequencies between 54 and 88 MHz. Channels 7 to 13 use 6 MHz blocks of VHF between 174 and 216 MHz, and channels 14 to 69 use 6 MHz blocks of UHF frequencies between 470 MHz and 812 MHz. In many applications, cable service providers use the frequencies between 88 MHz and 174 MHz for 13 channels of programming and begin channel 14 at 216 MHz. On cable-ready televisions, a user may toggle between CATV reception and Antenna reception. This toggling tells the television's tuner whether to tune around the restricted blocks in the FCC broadcast plan or to tune "straight through". In the CATV position, the tuner may start at 88 MHz.

As mentioned above, combiner 54 may output signal 56 with information streams representing broadcast channel programs modulated on carrier frequencies more commonly associated with Antenna reception. In effect, a cable service provider's broadcast channel 54, which may carry ESPN programming, may be modulated on a carrier frequency assigned to channel 7 by the FCC. As such, a user may be able to tune into the ESPN programming with a non-cable ready television by tuning the television to channel 7.

As depicted, device 12 may also include a local memory 60, which may store, among other things, recorded programming and a map linking a plurality of users or family members with associated carrier frequencies. The associated frequencies may be given approximately 6 MHz slices of the radio frequency spectrum that are more commonly associated with Antenna reception. A specific user may input a command identifying a desired video stream like ESPN programming. In some cases, the programming may be encoded in a Moving Pictures Expert Group (MPEG) format. As such, the desired video stream may need to be decoded by decoder 28 before being modulated on the carrier frequency associated with the specific user. The modulated signal may be output to premise network 58, and the user may be able to access the ESPN program by tuning any premise network connected television like televisions 46, 48, and 50 to the appropriate carrier frequency. In some embodiments, a given modulator, like modulator 30, may be fixed to output incoming signals on a predefined carrier frequency.

In effect, when a given user "changes the channel", the user causes device 12 to place a different program on the carrier frequency assigned to that user. If, for example, a family of five lives in a home with a coaxial cable-based premise network, the family may connect five different televisions to various cable outlets throughout the home. Each of the televisions may be set to Antenna reception, and the family may assign channel 7 to Dad, channel 8 to Mom, channel 9 to Child1, channel 10 to Child2, and channel 11 to Child3. If Dad "changes the channel", device 12 may recognize that Dad wants to watch a different show and may modulate a video stream representing that show on channel 7's frequency. As such, Dad may move to any of the five televisions and tune the television to channel 7 to watch his show.

In an embodiment where device 12 "knows" which family member is assigned to a given channel, device 12 may perform additional tasks. For example, device 12 may present messaging information addressed to a given user on that user's channel. In operation, messaging engine 62 may initiate communication of message information via premise network 58. Message information may represent a message sent using several different services such as electronic mail, mobile alerts, Instant Messaging, Short Messaging Service, Enhanced Messaging Service, and Multi-media Messaging Service.

Device 12 may also include enhanced parental control and metric tracking features. A metric engine 64 may track a metric associated with a specific user and/or a given information stream. The metric may include, for example, a video stream content rating, an amount of time associated with outputting the information stream, a cost associated with viewing the information stream, and/or an assigned programming channel for the first video information stream.

In the family of five referenced above, Mom may not want Child2 to watch shows having a "Teen" or above rating. Metric engine 64 may recognize that Child2 (or someone acting as Child2) is attempting to have a "Mature" program modulated onto channel 10—the channel assigned to Child2. Metric engine 64 may block the attempt and cause channel 10 to blue screen. Similarly, Dad may want to limit Child3 to two hours of television a week. Metric engine 64 may track "on time" for channel 11—the channel assigned to Child3. In another example, Mom and Dad may allow Child1 to watch pay-per-view sports, but may want to limit the total expenditure to twenty dollars a week. As such, metric engine 64 may allow specific sports-related premium channels to be modulated onto channel 9, but only until the cost for such pay-per-view streams reaches twenty dollars.

With such advanced programmable features, device 12 may also include a Web interface engine 66. Engine 66 may allow remote web-based administration of device 12. Device 12 may also include local administration features. As shown, graphical user interface (GUI) engine 68 may be capable of initiating presentation of a GUI on a television display communicatively coupled to premise network 58. The GUI may also be presented in connection with a Web browser and a Web browsing session of a user.

An administrator, which may be Mom in the above-referenced family, may be presented with an administration screen. The screen may allow for simplified configuration of the features associated with device 12. Additionally, the admin screen may allow Mom to configure or administer a home network that includes device 12.

As mentioned above, FIG. 2 shows a flow diagram for a technique 70 that may be used to implement teachings of the present disclosure. Technique 70 may begin at step 72 when a signal representing a plurality of programming and/or other information is received from a broader network. In some embodiments, the received signal may require some front-end operations, which may occur at step 74. These operations may include signal reception, demodulation, error correction, signal encoding, and/or other signal manipulations. The type and amount of necessary front-end operations may depend on the source of the received signal.

Figure 2:
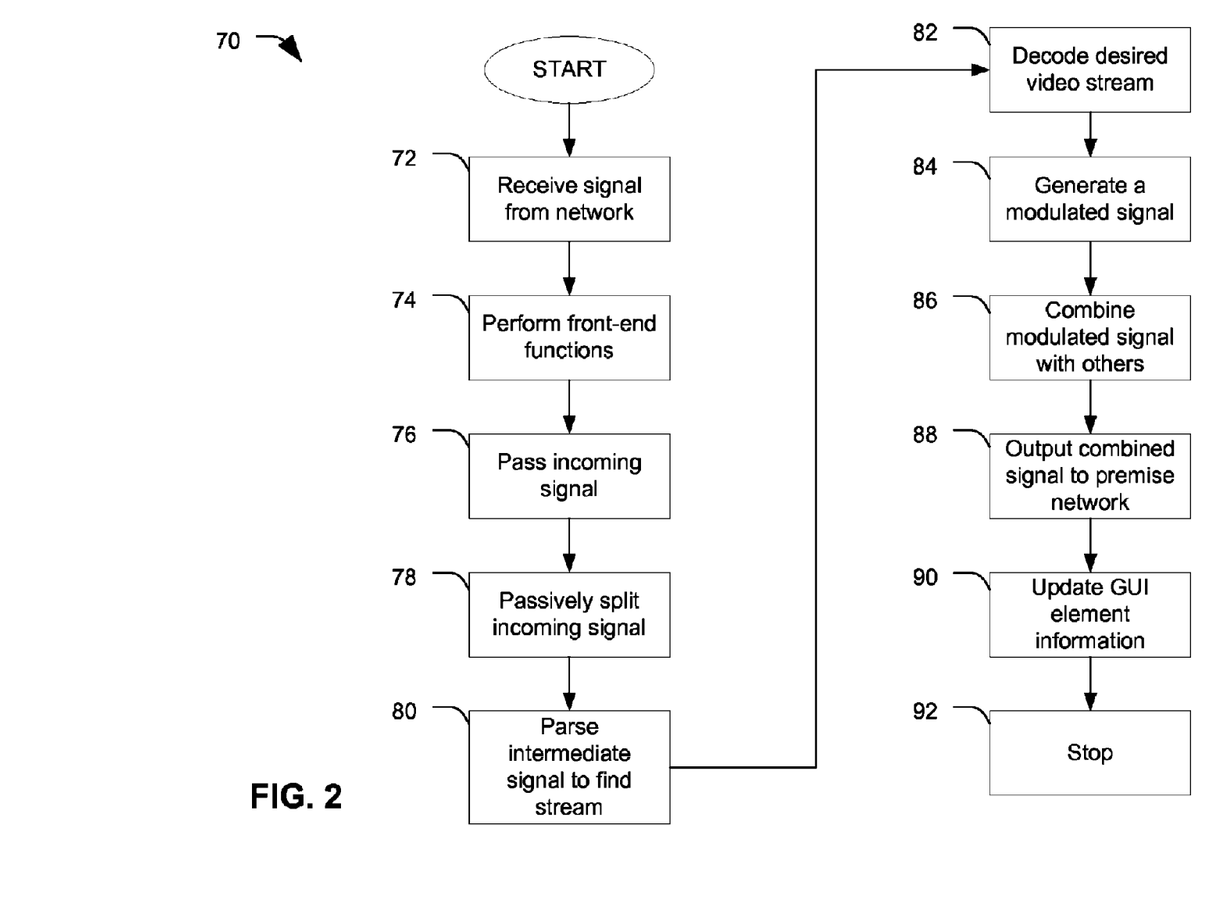
FIG. 2 shows a flow diagram for a technique that may be used to implement teachings of the present disclosure.

At step 76, a pre-processed signal may be passed along directly or indirectly to a splitter. The splitter may, at step 78, passively split the incoming signal into a plurality of similar intermediate signals. The plurality of signals may leave the splitter and move to a decoding element. The decoding element may be able to parse through a given intermediate signal to find a desired information stream included in the signal. The parsing function may occur at step 80.

At step 82, the decoding element may decode the desired information stream. The stream may have been encoded using an MPEG standard, like MPEG2. Once decoded, a modulator may "place" the decoded stream on a carrier frequency. The modulation may occur at step 84. In embodiments like the one depicted in system 10 of FIG. 1, there may be multiple decoder/modulator pairs. Each of the multiple modulators may have unique assigned carrier frequencies. As such, the output signals of the multiple modulators may be combined without fear of excessive interference. The signal combination may occur at step 86, after which the combined signal may be output to a premise network at step 88.

As depicted in technique 70, information associated with a GUI element may be updated at step 90. In a given embodiment, a system incorporating teachings of the present disclosure may be capable of presenting a GUI element that indicates the programming being distributed to the premise network. For example, an individual may want to know what show is currently being modulated on television channels 7, 8, 9, 10, and 11. To access this information, the individual may request display of the GUI element. By updating GUI element information at step 90, technique 70 helps ensure that the GUI element contains accurate information.

As depicted, technique 70 progress to stop at step 92 after updating the GUI element information. As mentioned above, FIG. 3 presents a simplified block diagram for a video distribution system 94 that incorporates teachings of the present disclosure. System 94 may include an STB-capable device 96 that has several remote controllable modules 98, 100, and 102. As depicted, modules 98, 100, and 102 may be configured to output a signal modulated to an assigned frequency block. In operation, a signal may arrive at device 96 directly or indirectly from a video service provider. For example, a DBS signal may be captured by a local satellite dish and fed to device 96 or a cable signal may arrive from a cable headend and be fed to device 96.

Figure 3:
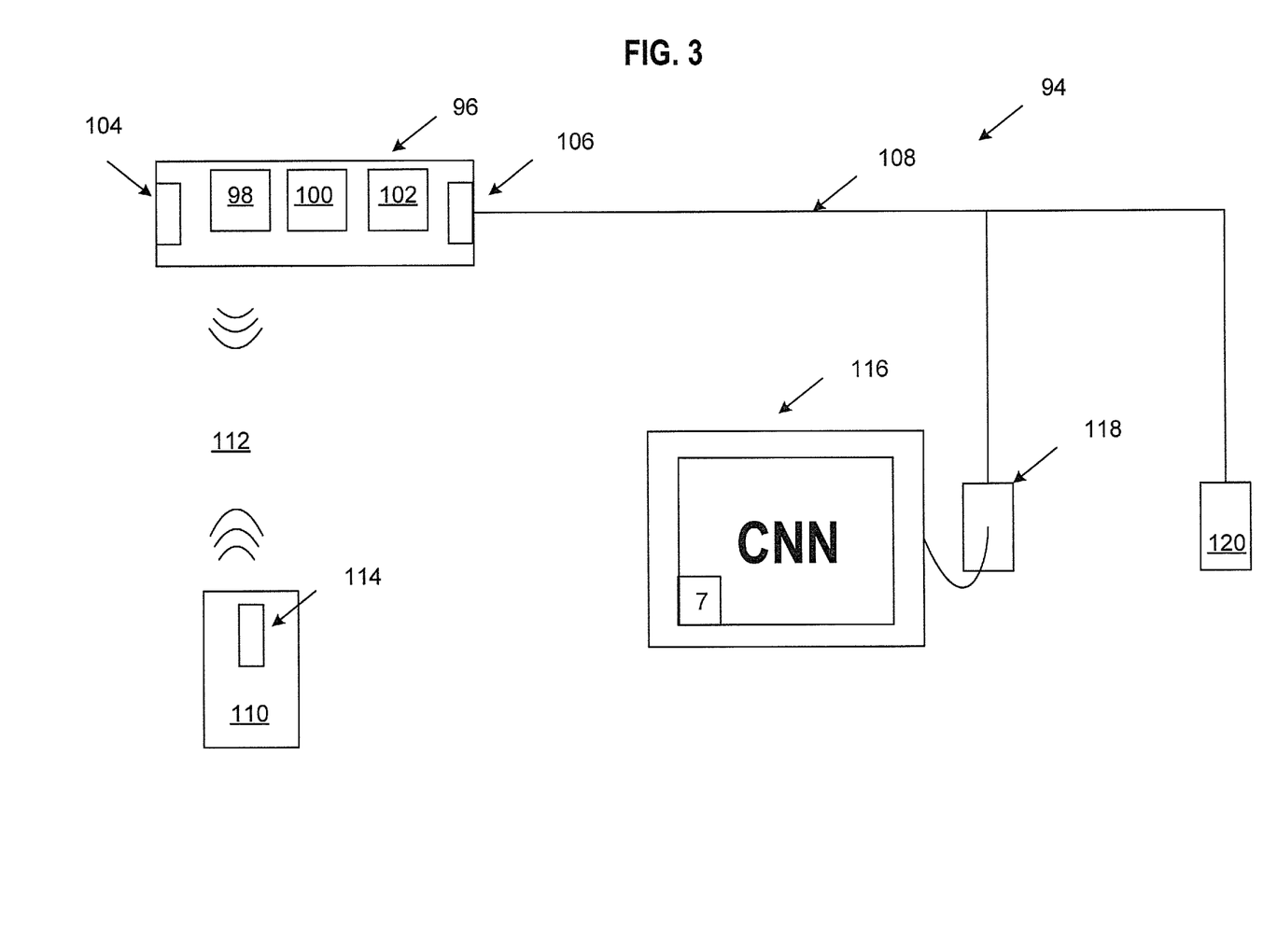
FIG. 3 presents a simplified block diagram for a video distribution system that incorporates teachings of the present disclosure.

The arriving signal may contain a collection of information streams representing various broadcast programs. The signal may enter device 96 via interface 104. The signal or some embodiment of the signal may then be passed to modules 98, 100, and 102. These modules may be capable of finding information, within the collection, that represents a specific broadcast program. The modules may then decode this found information to create a decoded version of what may have been a selected MPEG encoded video stream.

Modules 98, 100, and 102 may be configured to output their respective found signals to interface 106, which may transfer the signals to a premise network element 108. The premise network element may include a piece of coaxial cable, a wireless local area network node, or some other element capable of communicating information.

In operation, modules 98, 100, and 102 may have assigned frequency blocks defining a carrier frequency on which the modules should output their respective signals. In some embodiments, these frequency blocks may correspond to portions of the Very High Frequency and Ultra-High Frequency portions of the RF spectrum. In some embodiments of system 94, a module like module 98 may be addressable and may "listen" for remote control commands directing its operation.

As such, system 94 may include a remote control 110 capable of outputting individual commands to each of the modules. Remote control 110 may come in several different embodiments. In one embodiment, remote control 110 may be a wireless telephone that has Bluetooth functionality such as a class 3 type communication circuitry. In preferred embodiments, remote control 110 may communicate with module 98 wirelessly using an RF signal 112.

In some embodiments, remote control 110 may have an access engine 114. Access engine 114 may be able to authenticate the user of remote control 110. For example, a user may want to tell module 98 to put a different broadcast channel on the carrier frequency assigned to module 98. With reference to the family of five descriptions above, Dad may want to change from ESPN to CNN. Remote control 110 may ensure that the user seeking to change Dad's channel actually is Dad. As such, access engine 114 may prompt Dad to enter a username and password combination. Access engine 114 may employ credential schemas other than or in addition to simple username/password combinations. These schemas could be, for example, device-based and/or biometric based.

In response to authentication by access engine 114, remote control 110 may allow Dad to signal module 98 to output a different program on channel 7, which may mean module 98 will now modulate CNN to a carrier frequency having an approximate range of 174 to 180 MHz. As such, Dad may be able to tune television 116, which may be a premise network connected television, to channel 7 and access CNN programming.

As depicted in system 94, television 116 may be connected to the premise network via wall plate 118. In preferred embodiments, Dad could take television 116 or another display-capable device and connect to the premise network via wall plate 120. Again, if Dad tunes the display device to channel 7, Dad can enjoy CNN programming.

Figure 4:
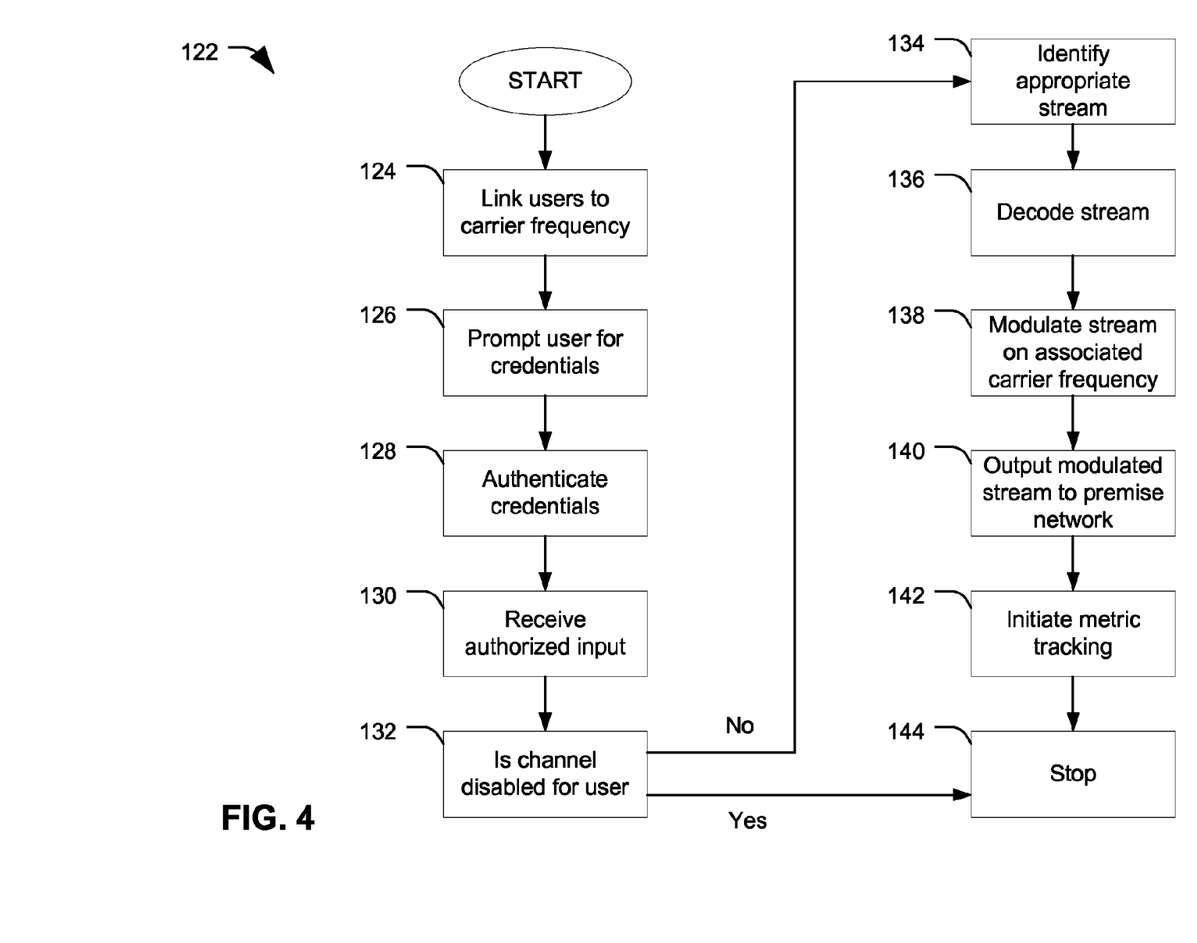
FIG. 4 shows a flow diagram for a technique that may be used to implement teachings of the present disclosure.

As mentioned above in the Brief Description of the Drawings, FIG. 4 shows a flow diagram for a technique 122 that may be used to implement teachings of the present disclosure. At step 124, a system like system 10 of FIG. 1 may allow an administrator to link users to a given premise network channel. At step 126, one of the users may indicate a desire to alter the programming available on their assigned channel, and that user may be prompted to input credentials. The credentials may be authenticated at step 128, and the system may receive an authorized input selecting a different video stream at step 130.

In an embodiment that allows broadcast channel blocking or some other form of viewing control, a system executing technique 122 may compare the requested channel against a block list to determine if the user is allowed to receive the selected channel. This analysis may be performed at step 132. If the user is not allowed to view the requested program or information, the user may be notified, presented with a blue screen, and technique 122 may progress to stop at step 144.

If the user is allowed to view the requested program or information, technique 122 may progress to step 134, and the appropriate stream may be identified. The stream may be decoded at step 136 and modulated on to an appropriate carrier frequency at step 138. The modulated stream may be output to a premise network at step 140 and, in systems that include metric tracking functionality; metric tracking may begin at step 142. Technique 122 may then progress to stop at step 144.

In various embodiments, the remote control may take forms including wireless and cordless phones, personal digital assistants with built in communications circuitries, universal remotes, wireless telephones, cellular telephones, mobile telephones, and other wireless devices.

The methods and systems described herein provide for an adaptable implementation. Although certain embodiments have been described using specific examples, it will be apparent to those skilled in the art that the invention is not limited to these few examples. Additionally, various types of wireless transceivers, transmitters, receivers, and protocols are currently available which could be suitable for use in employing the methods as taught herein. Note also, that although certain illustrative embodiments have been shown and described in detail herein, along with certain variants thereof, many other varied embodiments may be constructed by those skilled in the art.

The benefits, advantages, solutions to problems, and any element(s) that may cause any benefit, advantage, or solution to occur or become more pronounced are not to be construed as a critical, required, or essential feature or element of the present invention. Accordingly, the present invention is not intended to be limited to the specific form set forth herein, but on the contrary, it is intended to cover such alternatives, modifications, and equivalents, as can be reasonably included within the spirit and scope of the invention as provided by the claims below.

What is claimed is:

1. An apparatus, comprising:
   a local network interface device operable to modulate video data to frequency blocks for communication via a local network, wherein a first frequency block of the frequency blocks is associated with a first user;
   a processor; and
   a memory that stores a metrics engine module, wherein the metrics engine module is executable by the processor to cause the apparatus to track at least one metric associated with the first user based on the video data modulated to the first frequency block.

2. The apparatus of claim 1, wherein the memory further stores a graphical user interface (GUI) engine module that is executable by the processor to cause the apparatus to generate a display including information regarding the at least one metric.

3. The apparatus of claim 2, wherein the GUI engine module is further executable by the processor to cause the apparatus to send the display including the information regarding the at least one metric associated with the first user via a second frequency block that is associated with a second user.

4. The apparatus of claim 1, wherein the memory further stores data for media content, wherein the data for the media content includes the video data.

5. The apparatus of claim 1, wherein the memory further stores a messaging module, wherein the messaging module is executable by the processor to cause the apparatus to receive an electronic message addressed to a particular user and to provide information related to the electronic message via the local network interface device.

6. The apparatus of claim 5, wherein the messaging module is further executable by the processor to cause the apparatus to determine the particular user to which the electronic message is addressed and communicate the electronic message via a frequency block associated with the particular user.

7. The apparatus of claim 1, wherein the memory further stores data for mapping a plurality of users to a plurality of assigned frequency blocks.

8. The apparatus of claim 1, wherein the memory further stores an administration module, wherein the administration module is executable by the processor to cause the apparatus to generate an administration interface and to send the administration interface to a display device.

9. A method comprising:
   a computer-based system storing data that are usable to associate a plurality of users with respective carrier frequencies, wherein at least two of the plurality of users are associated with two different carrier frequencies;
   the computer-based system outputting a signal that includes a first video data stream, wherein the first video data stream has been modulated to a first carrier frequency associated with a first user, and wherein the modulating is at least partially based on the data.

10. The method of claim 9, wherein the data associating the plurality of users with the respective carrier frequencies is stored at a memory of the computer-based system.

11. The method of claim 9, further comprising:
    the computer-based system receiving user authentication data, wherein the signal is output in response to the computer-based system authenticating the first user based on the user authentication data.

12. The method of claim 9, wherein the signal is output based on media content stored at a memory of the computer-based system.

13. The method of claim 9, further comprising:
    the computer-based system receiving a change request; and
    the computer-based system modulating, based on the change request, a second video data stream to the first carrier frequency associated with the first user.

14. A video distribution system comprising:
    a processor;
    a memory configured to store data linking a plurality of users with associated carrier frequencies; and
    a first network interface device operable to output a signal for communication via a first network, the signal comprising a first video data stream modulated to a first frequency band associated with a first user, wherein the first video data stream is modulated based on the stored data linking the plurality of users with the associated carrier frequencies.

15. The system of claim 14, wherein the memory stores a radio frequency communication module executable by the processor to cause the apparatus to receive a control signal from a remote control device, and wherein a second video data stream is modulated to the first frequency band based on the control signal.

16. The system of claim 14, further comprising a device that stores an access engine module, wherein the access engine module is executable by the device to authenticate that a user of the device is associated with the first frequency band before a second video data stream is modulated to the first frequency band.

17. The system of claim 15, wherein the memory stores data for a block list associated with the first user, wherein the block list identifies content that the first user is prohibited to access, and wherein the processor is configured to compare content associated with the second video data stream to the block list before the second video data stream is modulated to the first frequency band.

18. The system of claim 14, further comprising a second network interface device operable to receive a plurality of video data streams from a second network, the plurality of video data streams including the first video data stream.

19. The system of claim 18, wherein the first network includes a local area network and the second network includes a wide area network.

20. The system of claim 14, wherein the memory stores data for parental control settings, wherein the parental control settings include a limitation on expenses for access to the first video data stream by the first user.

* * * * *